United States Patent [19]

Brearley et al.

[11] 4,320,460
[45] Mar. 16, 1982

[54] ANTI-SKID BRAKE CONTROL SYSTEM

[75] Inventors: Malcolm Brearley; John Adamson, both of West Midlands, England

[73] Assignee: Lucas Industries Limited, Birmingham, England

[21] Appl. No.: 76,492

[22] Filed: Sep. 17, 1979

[30] Foreign Application Priority Data

Sep. 15, 1978 [GB] United Kingdom ............... 37046/78

[51] Int. Cl.³ ................................................ B60T 8/02
[52] U.S. Cl. .................................... 364/426; 303/103; 303/110
[58] Field of Search ................... 364/426, 424; 303/20, 303/103, 105, 110

[56] References Cited

U.S. PATENT DOCUMENTS

| 3,834,770 | 9/1974 | Fleischer et al. | 303/110 |
| 3,930,688 | 1/1976 | Rau et al. | 364/426 |
| 3,937,525 | 2/1976 | Luhdorff et al. | 364/426 |
| 4,138,164 | 2/1979 | Masclet | 303/105 |
| 4,209,203 | 6/1980 | Brearley | 303/110 |
| 4,223,957 | 9/1980 | Brearley et al. | 303/110 |
| 4,230,376 | 10/1980 | Brearley et al. | 303/110 |

Primary Examiner—Errol A. Krass
Attorney, Agent, or Firm—Scrivener, Clarke, Scrivener and Johnson

[57] ABSTRACT

The invention provides a control system which predicts the brake re-apply point during a brake pressure release/re-apply cycle by measuring the duration of the synchronous running period, that period during which the wheel is decelerating at substantially the same rate as the vehicle. An increase in the synchronous running period above an optimum period is arranged to bring about an earlier re-application of the brakes in a cycle, and a decrease in the synchronous running period is used to effect a later re-application of the brakes. Various circuits are disclosed for detecting the duration of the synchronous running period. In a preferred circuit a track and store circuit compares an acceleration/deceleration signal with a stored signal whose amplitude follows that of the acceleration/deceleration signal, and the synchronous running period is taken to be the period between coincidences between the acceleration/deceleration signal and the stored signal. The timing of the brake re-apply signal is preferably controlled by varying a re-set threshold of a threshold switch responsive to wheel acceleration/deceleration.

11 Claims, 10 Drawing Figures

ANTI-SKID BRAKE CONTROL SYSTEM

SPECIFIC DESCRIPTION

This invention relates to a vehicle anti-skid brake control system.

It is known to control skidding of a braked wheel by providing wheel speed sensing means to produce a signal proportional to the angular acceleration of the wheel, and to use this acceleration signal to control release and re-application of the brakes. It has been appreciated that the point at which the wheel commences to skid following braking, can be related to the deceleration experienced by the wheel, and that skidding can be prevented by releasing the brakes at a predetermined value of the deceleration signal. Furthermore, it has been appreciated that following release of the brakes the wheel will accelerate to a maximum value and that it is appropriate to re-apply the brakes once this peak acceleration point has been passed, at which point the brake force coefficient is at a maximum. However, there is difficulty in some circumstances in detecting the peak acceleration point.

Also, it has been appreciated that there is a delay in re-applying the brakes as fluid brake pressure builds up and that this can lead to a loss of braking efficiency. In order to overcome this disadvantage, it is known to limit the reduction in fluid brake pressure on brake release by holding it substantially constant at a reduced level prior to brake re-application, lower pressure being deemed of minimal effect in brake release and disadvantageous in causing a delay whilst pressure is restored during brake re-application. However, such brake pressure release and hold characteristics causes the control system, and particularly the brake fluid control valves, to be more complicated.

An object of the invention is to provide a control system that more reliably predicts the brake re-apply point for optimum braking efficiency and that can operate without the need for a hold period after brake pressure release.

According to the invention a vehicle anti-skid brake control system comprises brake pressure control means for producing a release signal to trigger the release of brake pressure and a subsequent re-apply signal to trigger the re-application of brake pressure in successive brake pressure release/re-apply cycles, means for measuring the duration of the synchronous running period during which the wheel is decelerating at substantially the same rate as the vehicle, and means for adjusting the timing of the re-apply signal in dependence upon the duration of a previous synchronous running period whereby an increase or decrease in said period relative to an optimum period is effective to re-apply the brakes at an earlier or later time respectively.

By 'synchronous running period' we mean the period during which the wheel is decelerating at substantially the same rate as the vehicle. It will be appreciated that the wheel speed will usually be less than the vehicle speed during the synchronous running period.

Thus an increase in said period of synchronous running above said optimum period is taken as indicative of delayed braking response following brake re-application and thus the re-application point is shifted forward in time, whilst the non-appearance of any period of synchronous running is taken as indicative of premature brake re-application and the re-apply point is shifted backwards in time.

Preferably the timing of the re-application point is also varied in response to the duration of the brake release period of the current cycle, an increase in said duration being effective to retard the re-application point.

Preferably, the re-application point is controlled by a continuously variable control signal that changes in one sense during the synchronous running periods and changes in the opposite sense in the periods therebetween so that the control signal assumes a state of dynamic equilibrium under constant surface adhesion conditions.

Any change in surface adhesion conditions will produce changes in the synchronous running periods which in turn cause adjustment of the re-apply point so as to re-establish a new state of dynamic equilibrum corresponding to the optimum braking efficiency for the new surface adhesion conditions.

Preferably the duration of the immediately preceding synchronous running period is used to determine the timing of the re-apply signal, but if desired the duration of several preceding synchronous running periods may be taken into account.

Preferably the timing of the re-apply signal is controlled by varying a re-set threshold of a threshold switch responsive to wheel acceleration/deceleration.

Preferably, the synchronous running condition is determined from the characteristics of a wheel speed signal without reference to any separately derived vehicle speed signal. The system can then be reliably operated on isolated wheels or axles using only an acceleration signal derived from a wheel speed input, this signal being processed to adjust the system response to produce skid cycles which give a high adhesion utilisation efficiency on any surface. This adaptive action achieves control of the brake re-apply point which ensures adequate wheel recovery over the $\mu$ slip curve peak, yet prevents any substantial period of under braking by analysis of the wheel response between skid cycles and generation of a continuous correction signal to modify the re-apply point on a closed loop basis for subsequent cycles.

There are various ways in which the commencement and termination times of the synchronous running period may be detected.

One method is to differentiate a wheel acceleration/deceleration signal and to detect peak values of the output of the differentiator.

In a preferred method, however, a track and store circuit is used which compares an acceleration/deceleration signal with a stored signal whose amplitude follows that of the acceleration/deceleration signal, the commencement and termination times being signalled by coincidences between the two signals.

In a further method the commencement time of the synchronous running period is taken to be the time at which wheel deceleration is substantially zero, and the termination time of the synchronous running period is taken to be the time at which wheel deceleration reaches a predetermined threshold value which is less than the value at which the brake release signal is produced.

The invention will now be further described, by way of example only, with reference to the accompanying drawings in which.

Figure 1:
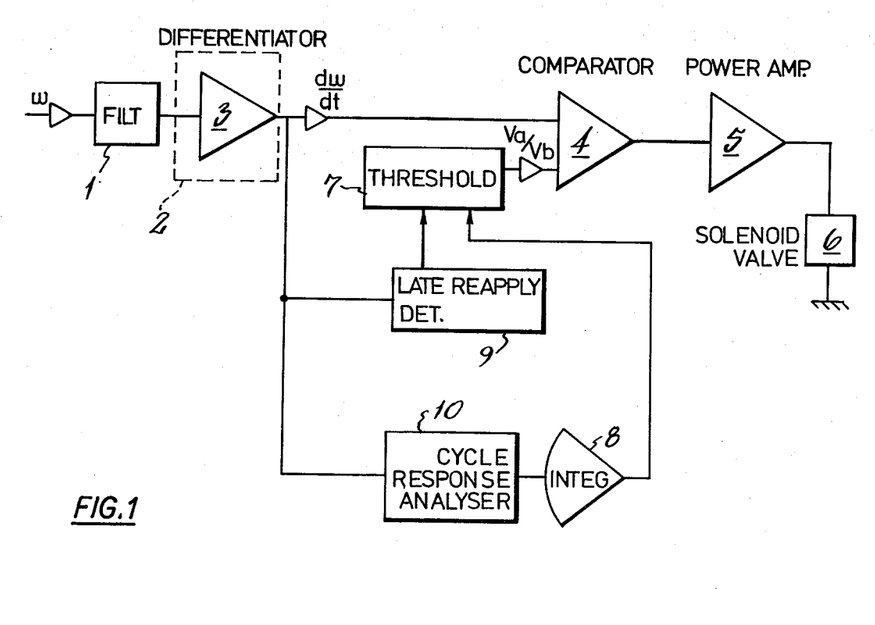
FIG. 1 is a block circuit diagram of an anti-skid brake control system in accordance with the invention.

In the system of FIG. 1 a dc signal w proportional to wheel speed is fed by way of a filter 1 to a differentiator 2 incorporating an amplifier 3. The differentiator 2 produces deceleration and acceleration signals in response to the development of and recovery from a wheel skid condition. The deceleration signal is detected by a comparator 4 which switches when the initial detection threshold Va of a threshold circuit 7 is exceeded. The comparator 4 provides a drive signal to a power amplifier 5 to energise a simple solenoid valve 6 and effect brake release. The comparator 4 has variable hysteresis set by the threshold circuit 7 which then allows the comparator 4 to reset only when this level of deceleration has dropped below the initial detection level. This reset point is adjusted over a wide range of deceleration to acceleration by a correction integrator 8 in order to select the point of optimum re-apply on each skid cycle. The integrator 8 is controlled by a cycle response analyser 10 which receives the acceleration signal dw/dt from the output of differentiator 3. If the integrator 8 has selected a high level of acceleration as being required before re-application is signalled, and if this level is not achieved, a late re-apply detector 9 responsive to the output of differentiator 2 will generate a substitute signal when the wheel has passed through the optimum slip point corresponding to a clear recovery over the μ slip curve peak.

Figure 2:
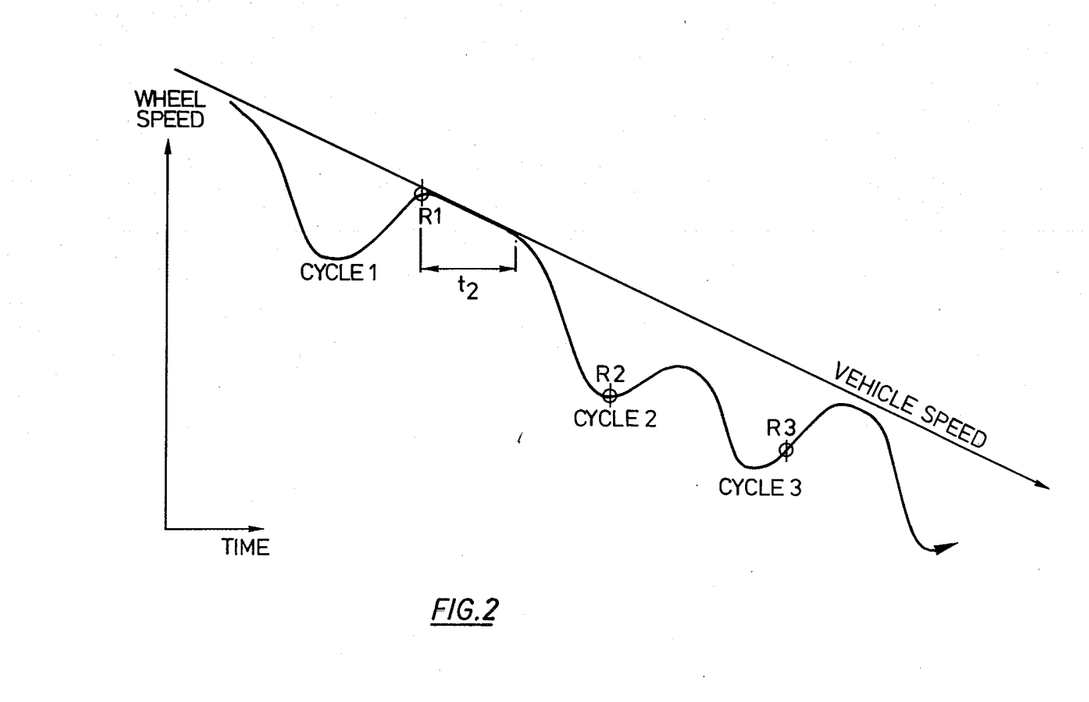
FIG. 2 is a graph illustrating the variation in cycle responses as the re-apply point is adjusted.

FIG. 2 illustrates the variation in brake release/re-apply cycle responses as the re-apply point is adjusted. Cycle 1 has a late re-apply point R1 leading to a substantial period of under braking as brake pressure is built up during time t2. The result of premature re-application is shown in cycle 2, where brake pressure is built up as soon as the deceleration terminates, preventing full wheel recovery taking place before the next skid cycle starts. If all cycles were to re-apply prematurely as at R2, the wheel would develop a cascade condition where skids develop in close succesion gradually departing from the vehicle speed entirely and cycling down to a wheel locked condition. Cycle 3 is an optimum re-apply condition where the brake pressure builds up to the skid pressure as the wheel slip falls below that level corresponding to the μ slip curve peak. This response is the objective of all anti-lock systems and is realised in the system according to the invention using adaptive control to give continuous correction of the re-apply point to prevent responses similar to cycles 1 and 2 despite changes in or disturbance to the anti-skid system resulting from variation of adhesion level or fluctuation in pressure rise rate. The proposed systems can be made capable of generating the re-apply signal at any point on a wheel recovery cycle between the end of excess deceleration being detected as at R2, to the end of wheel recovery as at R1, but these extremes would only be generated in response to correction signals resulting from very high μ operation or from very low μ operation, respectively. This wide variation is an essential control parameter and is achieved by providing the deceleration comparator 4 with a wide level of hysteresis which can be varied to reset the brake release signal at any point from a level of deceleration somewhat below the initial detection threshold, up to possibly twice the amplitude of the detection threshold in the acceleration direction.

Figure 3:
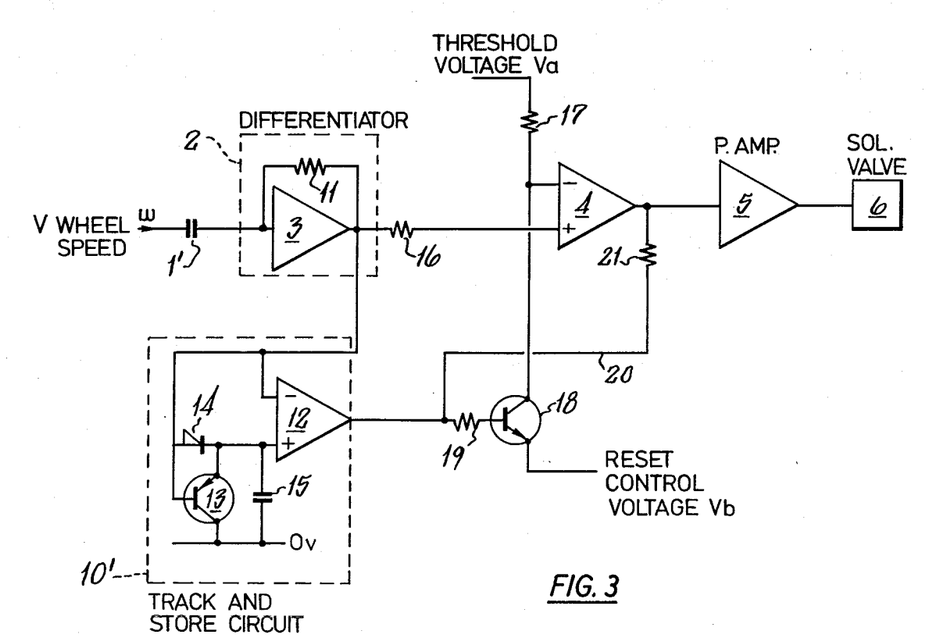
FIG. 3 is a more detailed circuit diagram of a system in accordance with FIG. 1.

The system of FIG. 3 is in accordance with the block diagram of FIG. 1 except that the integrator 8 is not shown. The differentiator 2 includes the usual feedback resistor 11, and filter 1 which includes a capacitor 1'. The cycle response analyser 10 together with the late reapply detector 9 of FIG. 1 takes the form of a track and store circuit 10' comprising a comparator 12, transistor 13, diode 14 and capacitor 15. The operation of such a track and store circuit is described in detail, in particular at lines 43 to 82 of page 3, in the Specification of British Pat. No. 1,539,210 but will be briefly described hereinafter.

The output of the differentiator 2 is connected to the negative input of comparator 12, to the positive terminal of diode 14 and to the base of transistor 13 which has its collector connected to a zero potential line, and its emitter connected to the negative terminal of diode 14. The negative terminal of diode 14 is connected to the positive input of comparator 12, and a capacitor 15 is connected between the positive input and the zero potential line. The input of amplifier 3 is biassed to produce a mid-range quiescent voltage output which thereby swings positive in response to deceleration and negative in response to acceleration. When the output of differentiator 2 is positive in response to deceleration, capacitor 15 is charged up through diode 14, but as soon as the deceleration starts to fall the capacitor 15 is left charged to a higher voltage than that currently appearing at the output of the differentiator. Transistor 13 then acts as an emitter follower to maintain a preset voltage difference between the positive and negative inputs of comparator 12. This preset voltage difference thus appears at the inputs of comparator 12 shortly following the maximum deceleration condition.

The output of differentiator 3 is connected through a resistor 16 to the positive input of comparator 4 the negative input of which is connected by way of a resistor 17 to a threshold voltage Va and directly to the collector of a transistor 18 which controls the reset threshold of comparator 4. The emitter of transistor 18 is connected to a reset control voltage Vb, and its base is connected by a resistor 19 to the output of the track and store circuit 10'. Switching of transistor 18 is controlled jointly by the track and store circuit 10' and by the output of comparator 4 through a connection 20 incorporating a resistor 21.

The comparator 4 is switched if the deceleration exceeds a predetermined threshold as set by Va on the comparator negative input. Once the comparator switches the solenoid valve 6 is energised by the power amplifier 5. Once the deceleration has started to fall from its peak value the output of comparator 12 of the track and store circuit 10' will swing positive so long as the output of comparator 4 has switched and is driving the power amplifier 5.

When the output of comparator 12 is positive transistor 18 is held conducting so as to connect the reset control voltage Vb to the threshold setting input of comparator 4. With a high value of reset control voltage Vb applied, the deceleration has only to fall slightly below the detection threshold before reset of comparator 4 takes place. A low reset control voltage Vb however requires a high level of re-acceleration to be detected at the differentiator output, for reset. This reset control voltage Vb is dynamically adjusted throughout any anti-skid stop by the correction integrator (described hereinafter) in response to cycle analysis measurements taken on and between each cycle of operation. The circuit shown has a positive feedback action once comparators 4 and 12 switch, in that the reset point of comparator 12 is reduced once the deceleration starts to fall. If the required reset acceleration does not appear, as may be the case on some low $\mu$ surfaces, comparator 12 will reset when the recovery acceleration starts to fall, or for very low $\mu$ operation, passes through the zero acceleration point as the wheel ends recovery. When comparator 12 resets, transistor 18 is turned off restoring the original detection threshold on comparator 4 which then switches off removing the solenoid energistation to re-apply braking.

Figure 4:
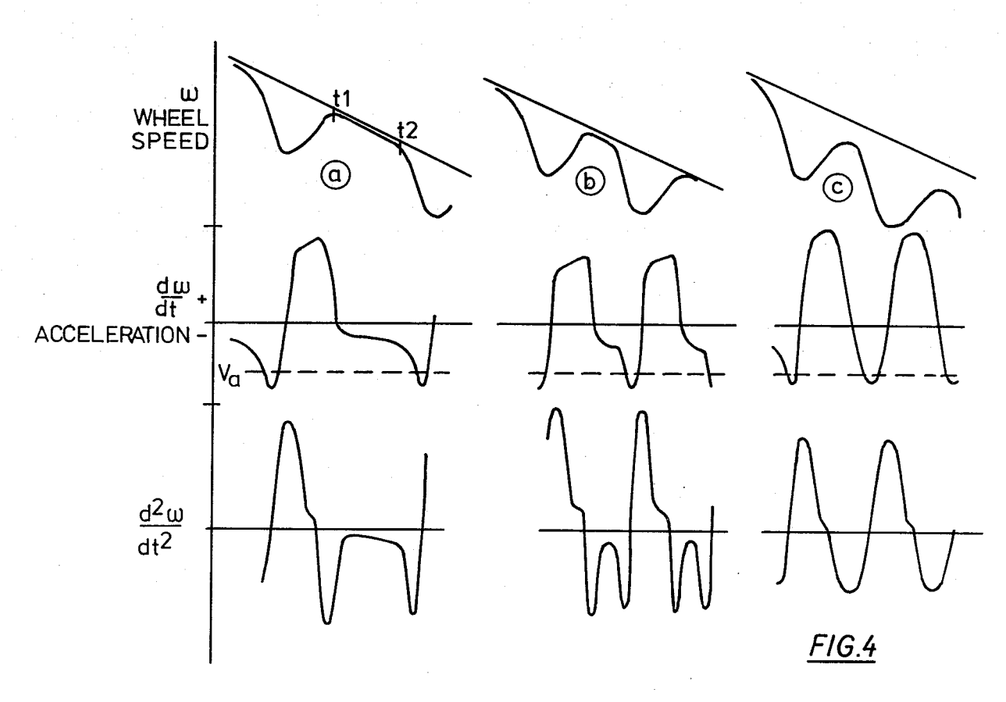
FIG. 4 is a series of graphs illustrating how the wheel acceleration, and the rate of change of wheel acceleration, varies during different kinds of cycle.

The reset control voltage Vb is produced by cycle analysis so as to provide a correction feedback quantity. Such analysis can be performed by several methods based primarily upon the wheel response between skid cycles. Three responses are shown in FIG. 4 with the respective acceleration traces being shown below, and below that the respective rates of change of acceleration signals which would be produced by further differentiation. In response (a) wheel cycles have substantial spacing due to late re-application and the acceleration curve falls at the end of wheel recovery to run at the vehicle deceleration between t1 and t2 whilst brake pressure builds up the skid level again. This time t2—t1 is a measure of application efficiency and ideally should be present and detectable, but as short as possible. The time period concerned can be seen more readily if the rate of change of acceleration trace $d^2w/dt^2$ is considered as this yields a double-lumped response in the negative direction, corresponding to the fall of acceleration and the build up of deceleration between skid cycles. The time period of interest in the response analysis is then the delay between the two peaks which can be relatively easily extracted. For cycle (b) which is closed to the optimum response, a double lumped acceleration derivative is obtained but the peaks are more closely spaced indicating that the wheel only remains at the vehicle deceleration for a short period. Cycle (c) illustrates cascade cycling produced by premature re-application on each cycle and here the wheel does not at any time adopt the vehicle deceleration, but passes from recovery fall off into the next cycle deceleration without any hesitation, and therefore does not produce a double lumped acceleration drivative response. This absence of twin negative peaks is a clear indication that cascade cycling is taking place and may be used to delay substantially re-application in an adaptive controller to remove effectively the condition on the following cycles, thereby allowing full wheel recovery.

The cycle analysis we propose is therefore based on an assessment of the period of each cycle for which the wheel runs near synchronous speed. This method of analysis does not require a measure of the synchronous speed so that it is applicable to single axle or wheel systems which for necessity or convenience must be isolated. The correction signal is formed dynamically in an electronic integrator which assesses the synchronous period against the whole cycle period on a continuous dynamic basis to produce an acceleration requirement for re-application on each wheel cycle.

Three subsystems will now be described with reference to FIGS. 5 to 7 for generating from acceleration signals dw/dt the integrator input waveforms required by the circuits of FIGS. 1 and 3 for closed loop adaptive control of brake re-application.

Figure 5:
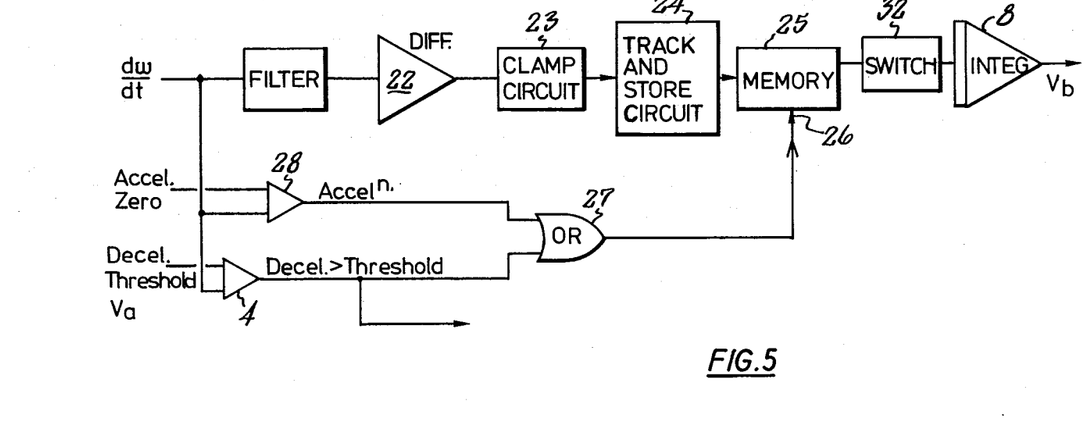
FIGS. 5 and 6 are block circuit diagrams of subsystems in accordance with the invention for generating integrator input waveforms.

The block diagram of FIG. 5 shows the use of a second differentiator 22 acting on a filtered acceleration signal dw/dt produced by the differentiator 2 of FIG. 3. The output signal from differentiator 22 is clamped by a diode clamp circuit 23 which passes only the negative half cycle, i.e. the double or single peaks of the acceleration derivative which are of interest. These peaks are then applied to a track and store circuit 24 similar to the track and store circuit 10 of FIG. 3 which can detect the peaks and provide signals to control a memory latch 25 which follows. The memory latch 25 drives integrator 8 by means of a switch 32. Each peak provides a signal at the output of circuit 24 to set this memory latch 25. The memory latch 25 has a reset terminal to which a reset signal is applied to provide an override condition if the wheel is accelerating or decelerating at a rate greater than the detection threshold. Thus the memory is set only by the first peak and is reset immediately the detection threshold Va is exceeded. The period for which the memory remains set is then approximately equal to the spacing between the two peaks since the second peak results from increasing deceleration as the next skid cycle starts.

The logic circuit which provides a signal at reset terminal 26 comprises an OR-gate 27 the two inputs of which are respectively connected to the output of comparator 4 and to the output of a further comparator 28. As has previously been explained, comparator 4 detects the presence of excessive deceleration. Comparator 28 has a threshold input connected to zero potential so that it produces an output to hold memory 25 reset when its other input receives an acceleration signal from differentiator 2.

Use of a second differentiator 22 gives problems with amplification of noise unless the signal has good purity so that removal of this component can have some advantage in certain applications. FIG. 6 is a block diagram of a cycle analysing system which produces the integrator input waveform without the use of a second differentiator, yet operates on similar principles by acting directly on the acceleration waveform. Use is made of a second track and store circuit 29 similar to circuit 10' of FIG. 3. The elements corresponding to diode 14, transistor 13 and capacitor 15 of the second track and store circuit 29 constitute an acceleration follower 30, and a comparator 31 corresponds to the comparator 12, except that the comparator 31 is biassed to swing towards high deceleration levels when the input signal is static or changes very slowly. The inputs of comparator 31 as shown in full and broken lines in FIG. 7, follow the acceleration peak and even with the bias, the capacitor input (broken lines) lags behind as the acceleration falls. Point ta is detected by comparator 31 when the rate of change of acceleration falls as the wheel completes a recovery. The bias then modifies the follower action causing the capacitor voltage (broken lines) to continue changing until clamped by the input diode, corresponding to diode 14, after the differential input voltage has reversed causing the comparator 31 to change-over. This causes the switch 32 controlling the input of integrator 8 to close providing that the wheel is not accelerating or decelerating at a level higher than the detection threshold. These conditions are required at an AND gate 32 to provide switch drive in addition to the follower output signal and are produced by comparators 4 and 28, respectively.

Figure 8:
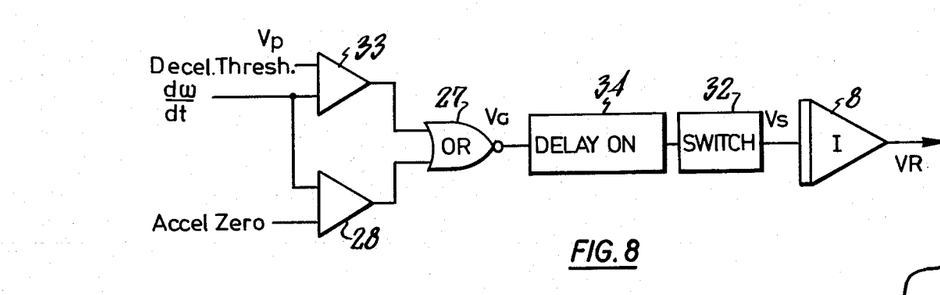
FIG. 8 is a block circuit diagram of part of a further system in accordance with the invention.
Figure 9:
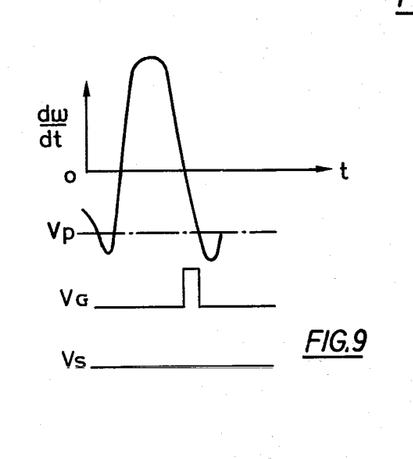
FIG. 9 is a graph showing the generation of a pulse at the output of the OR-gate of FIG. 8 during a cascade condition cycle.
Figure 10:
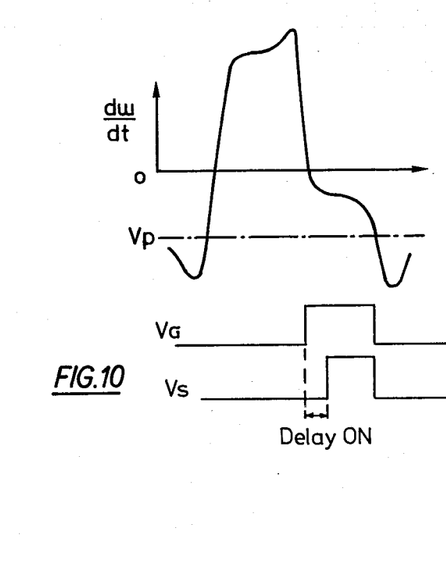
FIG. 10 is a similar graph to that of FIG. 9 but showing the generation of a pulse during a controlled cycle.

A third cycle analysing system is shown in FIG. 8 in which the input of integrator 8 is switched on for the duration taken for the deceleration to increase from zero to a primary level Vp approximately 60% of the detection threshold. The level Vp is set as the threshold of a further comparator 33. This represents generally a figure for the highest vehicle deceleration attainable under the best conditions of a non-skidding stop. Even in a cascade condition FIG. 9 where there is no suggestion of synchronous wheel speed being attained there must be a finite (though short) pulse VG at the output of OR-gate 27 in which deceleration builds up from zero to this primary level. The first part of the pulse VG is therefore ignored to allow for this non-sychronous pulse. This is achieved by a delay-ON circuit 34 in which the input pulse VG must be present for a preset period before any output pulse VS is produced, yet the output pulse terminates at practically the same time as the input pulse terminates. Allowing for this correction, the pulse produced is capable of controlling the integrator 8 to provide a continuous correction voltage. FIG. 10 shows the outputs VG and VS of the circuit of FIG. 8 for a normal controlled cycle.

Figures 6, 7:
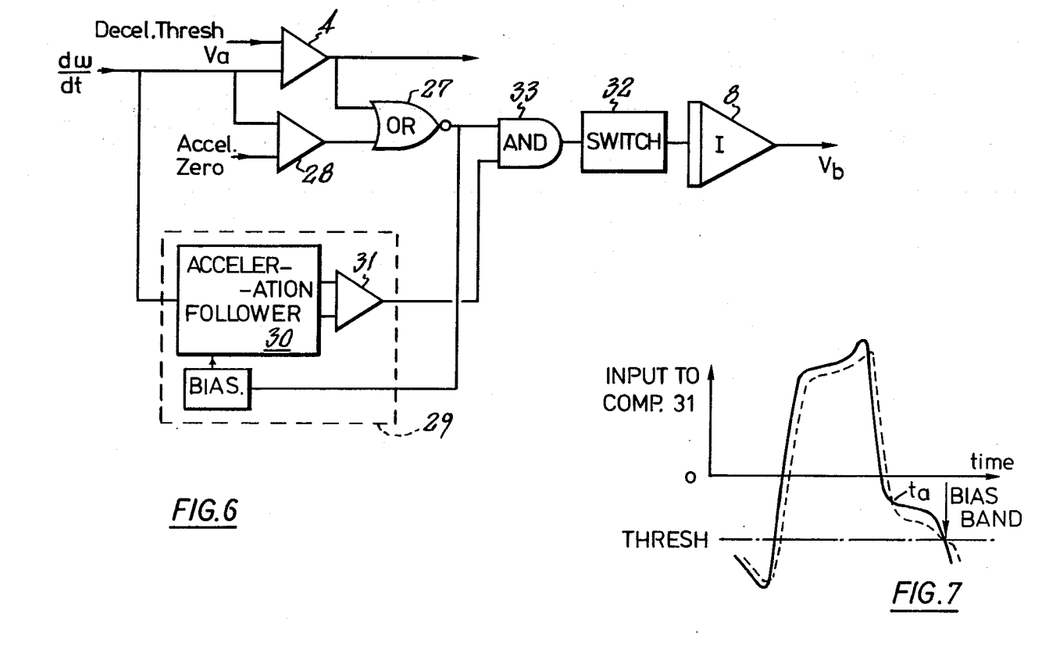
FIG. 7 is a curve showing the levels of the outputs of the acceleration follower circuit of FIG. 6 during a cycle.

In the three cycle analysing systems of FIGS. 5, 6 and 8 the output pulse produced, controls a switch at the integrator input circuit causing the integrator 8 to receive an input amplitude which produces a rising ramp output Vb which when applied to the comparator 4 adjusts the reset threshold in the direction of reducing acceleration, thereby effecting earlier re-application. During the remaining section of each complete skid cycle, the integrator sees a background input which causes the output voltage Vb to fall at a steady rate. Thus on constant adhesion conditions it is possible to obtain a dynamic equilibrium in which the integrator output Vb falls steadily over the majority of each cycle and then ramps up at a higher rate during the period of the control pulse from the cycle analyser, thereby starting each cycle at the same voltage. In addition this sawtooth voltage produced by the integrator 8 has the correct level at the re-apply point, to produce that re-apply in the correct position to give an optimum cycle response. If any disturbance, such as μ change or any other perameter variation, occurs the control pulse width will be affected and the integrator output level will rise or fall to restore the cycle response on following cycles. Consider a μ increase which then produces either a short skid cycle or a longer inter cycle period so that the integrator output voltage rises and gives an earlier re-apply on the following cycle to restore the ratio of cycle to intercycle periods. If μ drops the wheel may start to cascade and no control pulse is produced at the end of that cycle, so that the integrator continues falling throughout the whole of the following cycle retarding the re-apply point to the end of the recovery stroke where the acceleration starts to fall as wheel and vehicle speed become approximately equal.

We claim:

1. A vehicle anti-skid brake control system comprising brake pressure control means for producing a release signal to trigger the release of brake pressure and a subsequent re-apply signal to trigger the re-application of brake pressure in successive brake pressure release/re-apply cycles, means for measuring the duration of each synchronous running period during which the wheel is decelerating at substantially the same rate as the vehicle, and means for adjusting the timing of the re-apply signal in dependance upon the duration of a previous synchronous running period whereby an increase or decrease in the duration of said previous synchronous running period relative to an optimum duration of synchronous running period causes said re-apply signal to occur at an earlier or later time respectively.

2. A system as claimed in claim 1 in which the duration of the immediately preceding synchronous running period is used to determine the timing of the re-apply signal.

3. A system as claimed in claim 1 comprising a threshold switch responsive to wheel acceleration/deceleration, the timing of the re-apply signal being controlled by varying a re-set threshold of the threshold switch.

4. A system as claimed in claim 1 in which the duration of the synchronous running condition is determined entirely from measurements of the wheel acceleration/deceleration without measurement of the vehicle acceleration/deceleration.

5. A system as claimed in claim 1 comprising differentiator means for differentiating a wheel acceleration/deceleration signal to determine the commencement and termination times of the synchronous running period, the times being indicated by peak values of the output of the differentiator means.

6. A system as claimed in claim 1 in which the commencement and termination times of the synchronous running period are determined by a track and store circuit which compares an acceleration/deceleration signal with a stored signal whose amplitude follows that of the acceleration/deceleration signal, the commencement and termination times being signalled by coincidences between the acceleration/deceleration signal and the stored signal.

7. A system as claimed in claim 5 or claim 6 including integration means for measuring the time interval between the commencement and termination times.

8. A system as claimed in claim 7 including a logic circuit which prevents the integration means from measuring the time interval between the termination time of one synchronous running period and the commencement time of the succeeding synchronous running period.

9. A system as claimed in claim 1 in which the commencement time of the synchronous running period is taken to be the time at which wheel deceleration is substantially zero, and the termination time of the synchronous running period is taken to be the time at which wheel deceleration reaches a predetermined threshold value which is less than the value at which the brake release signal is produced.

10. A system as claimed in claim 1 in which the timing of the re-application point is varied in response to the duration of the brake release period of the current cycle, an increase in said duration being effective to retard the re-application point.

11. A system as claimed in claim 10 in which the timing of the re-application point is controlled by a continuously variable control signal that changes in one sense during the synchronous running periods and changes in the opposite sense in the periods therebetween.

* * * * *